United States Patent [19]
Suwa et al.

[11] 3,884,555
[45] May 20, 1975

[54] OPTICAL SYSTEM CAPABLE OF EXTREME CLOSE UP PHOTOGRAPHY

[75] Inventors: Michiharu Suwa, Tokyo; Akira Tajima, Kawasaki; Mamoru Shimazaki, Tokyo; Noritsugu Hirata, Yokohama, all of Japan

[73] Assignee: Canon Kabushiki Kaisha, Japan

[22] Filed: Sept. 18, 1973

[21] Appl. No.: 398,554

[30] Foreign Application Priority Data
Sept. 22, 1972 Japan............................ 47-95308

[52] U.S. Cl................................. 350/187; 350/184
[51] Int. Cl...................... G02b 15/18; G02b 15/16
[58] Field of Search............................ 350/184, 187

[56] References Cited
UNITED STATES PATENTS
3,784,285  1/1974  Watanabe et al.................... 350/187

Primary Examiner—Paul A. Sacher
Attorney, Agent, or Firm—Toren, McGeady and Stanger

[57] ABSTRACT

The optical system of this invention has a focusing lens, a variator, a compensator and an image forming lens such as a relay lens. The variator and the compensator are shifted in the direction of the optical system independently of the focusing lens and the image forming lens when zooming is effected. In the extreme closeup photography in which focusing is effected with respect to an object lying within the near range, the focusing lens, the variator and the compensator are shifted forwardly by a required amount with respect to the stationary image forming lens. To this end, a shifting mechanism is provided which is actuatable independently of the focusing of an object lying in the normal range as well as of the zooming thereby permitting the zooming operation to be effected while, at the same time, the extreme closeup photography is effected.

14 Claims, 7 Drawing Figures

OPTICAL SYSTEM CAPABLE OF EXTREME CLOSE UP PHOTOGRAPHY

BACKGROUND OF THE INVENTION

1. Field of the Invention

This invention relates to an optical system which is capable of zooming, i.e., varying the focal length of the optical system while the extreme closeup photography is effected, and, more particularly, to an optical system provided with a focusing optical system and a focal length varying optical system wherein means is provided for shifting the focusing optical system and the focal length varying optical system forwardly toward an object to be photographed along the optical axis with respect to the stationary image forming plane when the extreme closeup photography is effected.

2. Description of the Prior Art

A zoom lens system heretofore well known has a focusing lens group at the front side of the lens system and the focusing of an object located in the normal range of distance is effected by shifting the focusing lens group along the optical axis of the lens system. The zoom lens system has the so-called zoom optical system behind the focusing lens group. In the zoom lens system, a lens group forming a part of the zoom lens system is shifted along the optical axis thereby permitting the focal length of the entire lens system to be continuously varied while, at the same time, another lens group in the zoom lens system is shifted in the direction of the optical axis relative to the former lens group for the compensating purpose in order to prevent the deviation of the focusing point to be focused in the image forming plane such as the film plane. In such a zoom lens system of the mechanical compensation type, it is the common practice that the above described two sets of the movable lens groups play the roles clearly different from each other. In other words, the first mentioned lens group for effecting the variation in magnification by varying the focal length is referred to as a variator while the latter lens group for effecting the compensation for the deviation of the focusing point is referred to as a compensator. A normally stationarily positioned image forming optical system and other lens components are located behind the zoom lens system.

Among the photographing techniques wherein the above described optical system is used in combination with a motion picture camera and the like, there is a technique referred to as an extreme closeup photography or a macrophotography. This is directed to effect focusing of an object located nearer to the lens than an object located at a position in the normal range for photographing, and this technique has been impossible by a majority of the prior art motion picture cameras wherein only the focusing lens is actuatable for focusing.

Recently, however, an optical system or a camera has been proposed by which the above described extreme closeup photography is made possible.

The techniques heretofore known as the so-called macrophotography can be divided into the following two methods.

The one is the technique in which either one of the variator and the compensator which are conventionally called the zooming portions in the above described optical system is shifted along the optical axis beyond the extremities in the zooming operation, i.e., beyond the wide angle position or beyond the telephotography position so that focusing is effected with respect to an object located at a position in the extreme near range.

The other is the technique in which the image forming optical system in the above optical system, for example, a relay lens, which is held stationarily during the ordinary photographing, i.e., when the focusing is effected with respect to an object lying in a position in the ordinary range of distance, is moved as a whole or a portion thereof is moved along the optical system so as to permit the focusing to be effected with respect to an object lying in the extreme near range.

The former technique is disclosed in U.S. Pat. Nos. 3,613,544 and 3,655,271, for example.

The latter technique is disclosed in U.S. Pat. No. 3,659,921 and other patents, for example.

Comparing the above two techniques with each other, it is impossible in the former technique to effect the zooming operation in the macrophotography because the macrophotography is carried out by utilizing the zooming operation. This is due to the fact that the lens for effecting the macrophotography is used commonly as the zoom lens thereby affording restriction in the operation of the optical system.

To the contrary, in the latter technique, the macrophotography is carried out by shifting the lens which does not directly take part in the zooming operation and, therefore, the zooming operation can be freely effected in the macrophotography.

In order to carry out the macrophotography by moving at least a part of the image forming optical system as described, however, a surplus space is required for shifting the image forming optical system, because the lens which must be shifted for the macrophotography is located behind the above described zooming lens portions. And such a space is a dead space which is not required for the ordinary photography. Therefore, the entire length of the lens constructions is made necessarily great in the ordinary photographing resulting in the greater weight so that not only the manipulation is made inconvenient, but also the diameter of the front lens must be made great even though such a large diameter is not necessary for the ordinary photographing and the production cost is necessarily made high.

Summary of the Invention

It is an object of this invention to eliminate the above described disadvantages of the prior art optical system and to provide an optical system having a novel construction and effectiveness capable of extreme closeup photography and a device for shifting the optical system for achieving the extreme closeup photography.

The other object of this invention is to provide an optical system comprising a front focusing lens, a zoom lens including a variator and a compensator, and an image forming lens arranged in that order from the front side of the optical system and wherein, in the extreme closeup photography, the above described front focusing lens and the zoom lens are shifted integrally forwardly with respect to the stationary image forming lens located behind the front focusing lens and the zoom lens, and a shifting device for effecting the above shifting of the front focusing lens and the zoom lens.

In a preferred embodiment of this invention, an optical system is utilized which comprises a front focusing lens movable in the direction of the optical axis, a zoom lens including a variator and a compensator and actuatable independently from the focusing lens and a stationary relay lens provided behind the zoom lens, and a lens barrel is provided which supports integrally the above focusing lens and the zoom lens, a shifting mechanism being provided for shifting the lens barrel forwardly with respect to the stationary relay lens arranged behind the lens barrel, thereby permitting the focusing lens to be shifted independently from the zoom lens and the relay lens during the focusing operation for an object located at a distance in the normal range, while, in focusing an object in the extreme near range, both the front focusing lens and the zoom lens can be shifted together by the above described shifting mechanism in the forward direction independently from the relay lens. Thus, the zooming operation can be effected by shifting the above described variator and/or the compensator in either of focusing operation for objects located in the normal range and in the extreme near range as described above by making it possible to effect the zooming operation in addition to the possibility of focusing an object in the extreme near range, the following optical effectiveness can be achieved:

For example, when such an optical system is built in a motion picture camera or a television camera so as to effect the photographing of an object A located in the extreme near range and an object B located behind the object A in the normal range, the focusing is made first with respect to the object A, and then the focusing can be made with respect to the object B with the size of the object A or B in the image frame being held substantially the same with each other. As a suitable example when a scene of an orchestra play is to be photographed, for example, the conductor, for example, is first photographed in the extreme closeup photographing mode by shifting forwardly the focusing lens and the zoom lens together by means of the above described shifting mechanism so as to obtain a closeup of the conductor appearing substantially entirely of the image frame. Then, the photographing may be switched to aim any of the members of the orchestra to locate him in the image frame and focused gradually by merely actuating the zoom lens, and the size of the member appearing in the image frame can be made the same magnification as that of the conductor thereby permitting the expression of the member to be seen in detail.

The optical effectiveness of this invention obtained as described above is due to the fact that the focusing operation with respect to either of the object in the normal range and the object in the extreme near range can be effected independently from the lens elements for effecting the zooming operation.

Further characteristic features of this invention will be apparent from the following detailed description of the embodiments thereof when taking in conjunction with the accompanying drawings.

Figure 1:
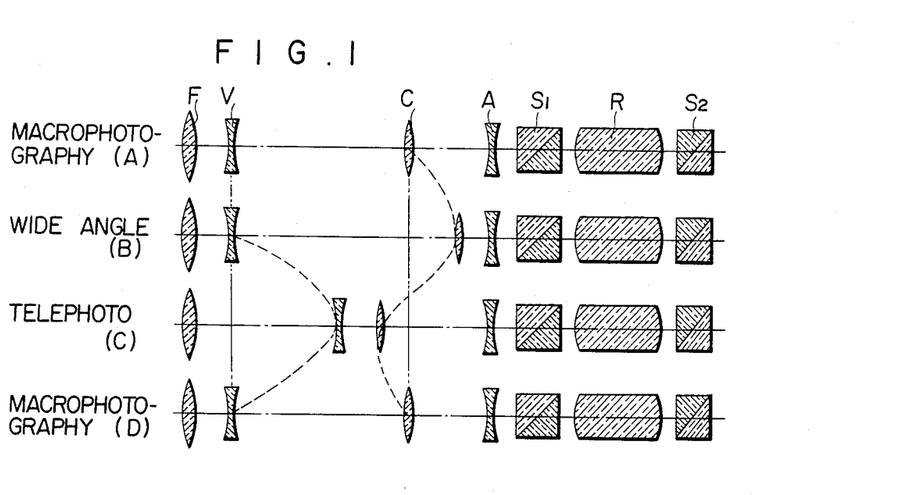
FIGS. 1 and 2 are explanatory views showing the manner of shifting lens components of the prior art optical system for effecting the zooming and the macrophotography.

DETAILED DESCRIPTION OF THE PREFERRED EMBODIMENTS:

FIG. 1 shows the prior art zoom lens system, the figure showing the zoom lens construction in which the variator or the compensator is shiftable so as to permit the extreme closeup photography. FIG. 1 shows particularly an example in which the compensator is shifted so that the extreme closeup photography is effected. In the figure, beginning at the forward end, the construction of the lens includes a position power focusing lens F, a negative power variator lens V, a positive power compensator lens C, an auxiliary optical system A to be inserted if necessity arises, a beam splitter $S_1$ for the finder, and image forming lens R such as a relay lens, and a beam splitter $S_2$ for the measurement of light quantity. FIG. 1 (B) shows the condition under which the zoom lens system is positioned at the wide angle position in the ordinary range of the zooming operation, while FIG. 1 (C) shows the condition under which the zooming lens system is positioned at the telephoto position in the ordinary range of the zooming operation. FIG. 1 (A) shows the position of the optical system as the zooming lens system is moved from the above described wide angle position to the extreme closeup photography while FIG. 1 (D) shows the position of the optical system as the zoom lens system is moved from the above described telephoto position to the extreme closeup photography. The movement of the zoom lens system is illustrated by the broken line. In this example of the prior art, since the extreme closeup photography is made possible only by further shifting the variator V or the compensator C in the zoom lens beyond the ordinary range of the zooming operation, it has a disadvantage that the zooming operation is impossible in the range of the extreme closeup photography.

Figure 2:
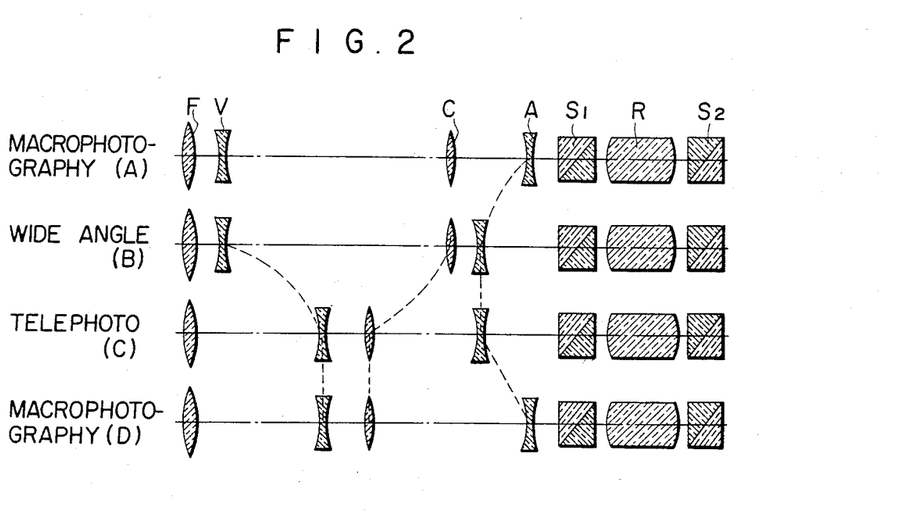

FIG. 2 shows the construction of the prior art zoom lens system wherein an auxiliary optical system which, in broader sense, is made a portion of the image forming optical system is shifted rearwardly during the extreme closeup photography so as to render the front optical system (located in front of the afocal system) to be an afocal system. The respective optical elements having the same function as those described previously are shown by the same reference characters so that detailed description may be eliminated. FIG. 2 (B) and FIG. 2 (C) show the positions at the wide angle position and the telephoto position, respectively. FIG. 2 (A) and FIG. 2 (D) show the manner of movement of the lens components from the wide angle position and the telephoto position to the position for the macrophotography. In this case, only the auxiliary optical system A, which is held stationarily in the ordinary zooming operation is shifted when the shifting to the macrophotography is effected, and, therefore, it is necessary to provide a dead space in the interior of the lens barrel for the entire optical system of the zoom lens system for accommodating the displacement of the auxiliary optical system, thereby resulting in the increased total length of the lens barrel for the entire optical system, and, further, the diameter of the front lens serving as the focusing lens F is made necessarily large due to the displacement of the auxiliary optical system A. This requires wastefully the provision of a front focusing lens having unnecessarily large diameter.

Figure 3:
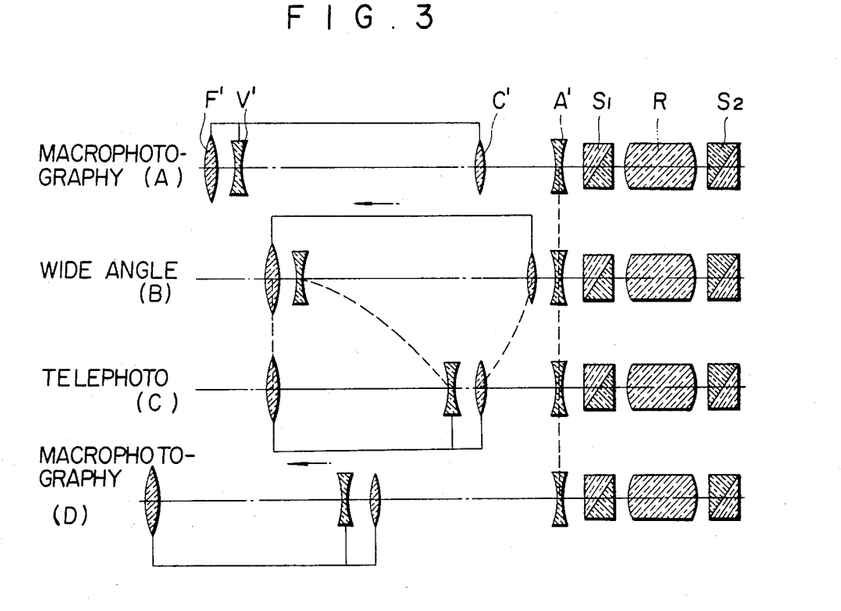
FIG. 3 is an explanatory view showing the manner of shifting the lens components of the optical system of this invention for effecting the zooming and the macrophotography.

In comparison with the prior art optical system, the above disadvantages are completely by adopting the construction of the zoom lens system of the invention as shown in FIG. 3. The arrangement of the optical system comprises, beginning at the front side of the optical system, a focusing lens system F', a variator V', a compensator C', an auxiliary optical system A', and $S_1$, R and $S_2$ similar to those described in connection with the previous optical system. Among these optical elements, $A_1$, $S_1$, R and $S_2$ are at all times held stationary in either of the ordinary photography and macrophotography. The three components F', V' and C' located at the front side of the optical system are arranged so that they are operably coupled with holding means so as to permit the above three components to be integrally shifted along the optical axis with respect to the image forming optical system including the auxiliary optical system located behind the above three components only when the macrophotography is to be effected, while, in the ordinary zooming operation, the variator V' and the compensator C' are independently shiftable with respect to the holding means adapted to integrally hold the above three components. The mechanical construction for arranging the zoom lens system as described above will be described later. FIG. 3 (B) and FIG. 3 (C) show the zoom lens system positioned at the wide angle position and the telephoto position, respectively. The ordinary zooming operation in these positions is effected by shifting the variator V' and the compensator C' along the optical system as shown by the broken line in the figure by means of a well known mechanism. FIG. 3 (A) shows the manner of effecting the extreme closeup photography by shifting the zoom lens system along the optical axis beyond the wide angle position, the focusing lens F', the variator V' and the compensator C' positioned at the wide angle position being integrally shifted forwardly as indicated by the arrow in the figure so as to permit the focal length to be set in the range of the macrophotography. FIG. 3 (D) shows the manner of effecting the extreme closeup photography by shifting the zoom lens system along the optical axis from the telephoto position, the above three optical components positioned at the telephoto position being shifted integrally forwardly as indicated by the arrow in the figure so as to permit the focusing in the range of the macrophotography. Of course, it is possible in any of the intermediate positions in the range of the ordinary zooming operation to focus an object in the extreme near range by shifting integrally the above three optical components independently of the zooming operation from the image forming plane forwardly toward the object. By such an extreme closeup photography as described above, the focusing can be effected with respect to an object lying in an position in front of the optical system in the extreme near range beginning at 0mm, for example. Such a focusing operation can be carried out by adjusting the amount of shifting of the above three optical components in the forward direction.

The zooming operation in the range of the above macrophotography can be carried out by shifting the variator and the compensator constituting the above zoom lens system along the optical axis after the above optical components are integrally shifted forwardly.

Next, the management of the lens elements in the preferred embodiments of the optical system of this invention as well as the design data therefore will be set forth below with reference to FIG. 4, Table 1 and FIG. 5, Table 2.

Table 1

(First Embodiment)
Focal length of the optical system $f = 7.238 - 69.79$mm
Zoom ratio : 9.504
Angle of view: 54.2° – 5.8°
$r_i$ ($i = 1 - 35$) = radius of curvature (mm) of the respective lens element.
$d_i$ ($i = 1 - 34$) = thickness of the respective lens element and the air space.
$n$ = Refractive power of the glass material of the lens element as measured by $d$ line.
$\nu$ = Abbe number of the glass material.

| No. | $r_i$ | $d_i$ | $n$ | $\nu$ |
|---|---|---|---|---|
| 1 | 191.7 | 1.7 | | |
| 2 | 58.385 | 0.366 | 1.80518 | 25.4 |
| 3 | 62.232 | 8.5 | | |
| 4 | −168.79 | 0.2 | 1.64000 | 60.2 |
| 5 | 43.4021 | 6.5 | | |
|   |        | (variable) | | |
| 6 | 207.42 | ($d_6$) | 1.64000 | 60.2 |
| 7 | 267.23 | 1.0 | | |
| 8 | 18.235 | 5.3 | 1.71300 | 54.0 |
| 9 | −29.654 | 0.7 | | |
| 10 | 18.9525 | 4.5 | 1.69680 | 55.7 |
|    |         | variable | | |
| 11 | 125.36 | ($d_{11}$) | 1.80518 | 25.4 |
| 12 | 585.23 | 1.19 | | |
| 13 | 43.22 | 6.98 | 1.80518 | 25.4 |
| 14 | −37.9 | 0.2 | 1.64000 | 60.2 |
| 15 | 38.2234 | 3.71 | | |
|    |         | variable | | |
| 16 | 224.952 | ($d_{16}$) | 1.65160 | 58.6 |
| 17 | −60.061 | 0.7 | | |
| 18 | 21.63 | 2.3 | 1.65160 | 58.6 |
| 19 | 50.002 | 2.35 | 1.80518 | 25.4 |
| 20 | ∞ | 11.0 | | |
| 21 | ∞ | 6.06 | 1.63854 | 55.4 |
| 22 | 21.63 | 3.37 | | |
| 23 | 63.98 | 2.62 | 1.76200 | 40.2 |
| 24 | 12.0776 | 3.07 | | |
| 25 | 29.918 | 1.83 | 1.71300 | 54.0 |
| 26 | 8.5258 | 6.07 | 1.80518 | 25.4 |
| 27 | −13.987 | 1.0 | | |
| 28 | 57.565 | 3.96 | 1.80518 | 25.4 |
| 29 | −19.74 | 0.41 | 1.67790 | 55.3 |
| 30 | 117.089 | 2.03 | | |
| 31 | −32.11 | 0.1 | 1.66446 | 35.8 |
| 32 | 21.7328 | 2.13 | | |
| 33 | −132.36 | 1.2 | 1.58144 | 40.7 |
| 34 | ∞ | 6.8 | | |
| 35 | ∞ | | 1.63854 | 55.4 |

The value each of the variable air spaces $d_6$, $d_{11}$ and $d_{16}$ in the above table are as follows when the variator V' and the compensator C' are positioned in their zooming operation at the wide angle position ($f = 7.238$), the intermediate position ($f = 15.72$) and the telephoto position ($f = 68.79$), respectively.

|  | $f = 7.238$ | $f = 15.72$ | $f = 68.79$ |
|---|---|---|---|
| $d_6$ | 1.000 mm | 14.826 mm | 28.652 mm |
| $d_{11}$ | 68.654 | 47.639 | 12.561 |
| $d_{16}$ | 2.006 | 9.195 | 30.446 |

Figure 4:
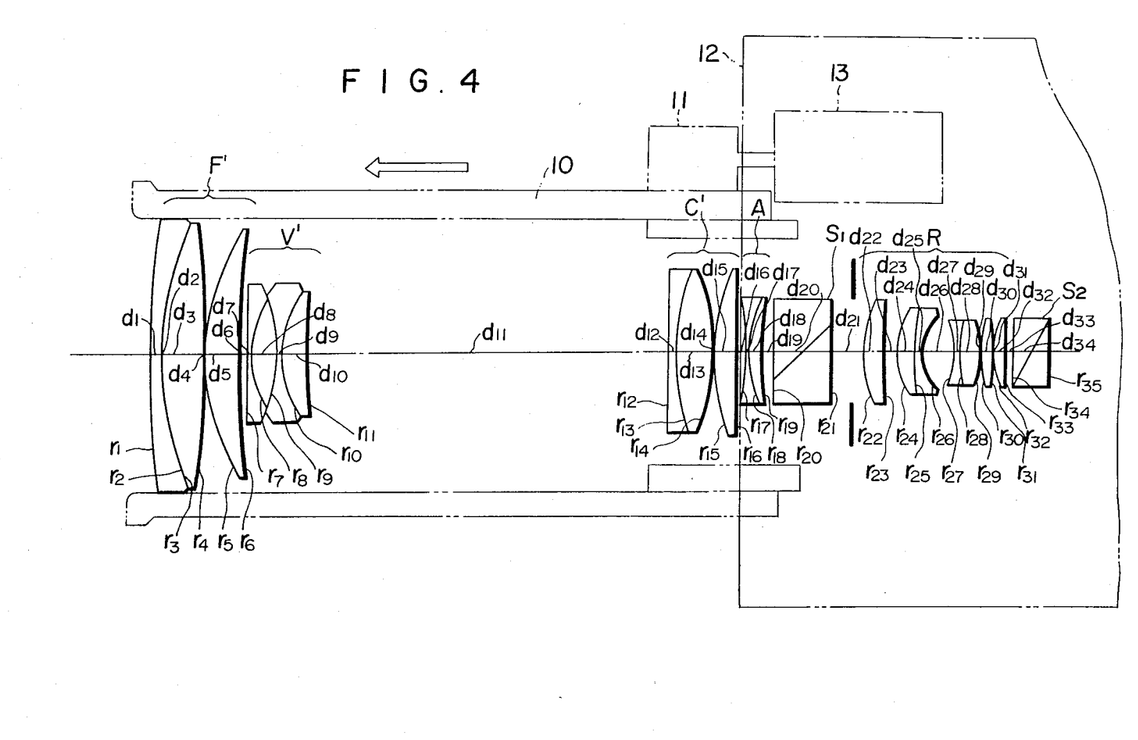
FIG. 4 is a longitudinal sectional view showing an embodiment of the optical system of this invention shown in FIG. 3 with the lens shifting mechanism being shown in phantom.

The distance Smm between the object and the front surface of the focusing lens F' and the magnification $\beta$ obtained under the conditions that the focusing lens F', the variator V' and the compensator C' shown in FIG. 4 taken as an example are positioned respectively at the wide angle position ($f = 7.238$), at the intermediate positions in the movements of the variator and the compensator ($f = 15.72$) and at the telephoto position ($f = 68.71$) and they are moved respectively forwardly by 5mm in order to achieve the extreme closeup photography by using the above described optical system are as follows:

|   | $f = 7.238$ | $f = 15.72$ | $f = 68.79$ |
|---|---|---|---|
| S | −1.89 mm | −104.67 mm | −3385.5mm |
| $\beta$ | −0.1944 | −0.0895 | −0.0204 |

In this case, the focusing lens F' is located at the innermost position.

It is possible to set preliminarily the position of the front focusing lens so as to maintain the magnification in about a constant value.

In other words, the above facts show that, when the zooming operation is effected after the above described three optical components are shifted integrally forwardly by 5mm, an object located at a distance of 1.89mm from the focusing lens can be made in focus when the optical system is positioned at the wide angle position, and, during the zooming operation toward the telephoto position, an object located at a distance of 104.67mm from the focusing lens can be made in focus at the intermediate position ($f = 15.72$) of the zooming lens system, while an object spaced a distance of 3385.5mm from the focusing lens can be made in focus at the telephoto position of the zoom lens system.

When the forward shifting of the above three lens components is further continued and the lens components are brought to a position shifted forwardly by 129.799mm which is the limit in the above optical system, the focusing can be effected with respect to an object located at a distance of 145.74mm from the focusing lens F' when the zoom lens system is in the telephoto position, and the magnification at this time is −0.531.

The second embodiment will be described in connection with Table 2 and FIG. 5.

Table 2

(Second Embodiment)

Focal length of the optical system $f = 7.483 - 58.057$mm
Zoom ratio: 7.759
Angle of view: 51.13° − 7.06°
$r_i, d_i, n, \nu$ = the same as those used in Table 1.

| No. | $r_i$ | $d_i$ | $n$ | $\nu$ |
|---|---|---|---|---|
| 1 | 139.35 | 1.72 | 1.805 | 25.4 |
| 2 | 56.25 | 8.5 | 1.64 | 60.2 |
| 3 | −214.5 | 0.1 | | |
| 4 | 44.32 | 5.0 | 1.64 | 60.2 |
| 5 | 109.5 | variable ($d_5$) | | |
| 6 | 108.12 | 0.7 | 1.713 | 54.0 |
| 7 | 19.78 | 3.2 | | |
| 8 | −38.56 | 0.7 | 1.772 | 49.6 |
| 9 | 37.26 | 2.3 | | |
| 10 | −99.1 | 0.7 | 1.723 | 38.0 |
| 11 | 16.62 | 4.5 | 1.784 | 26.0 |
| 12 | −69.65 | variable ($d_{12}$) | | |

Table 2-Continued (Second Embodiment)

Focal length of the optical system $f = 7.483 - 58.057$mm
Zoom ratio: 7.759
Angle of view: 51.13° − 7.06°
$r_i, d_i, n, \nu$ = the same as those used in Table 1.

| No. | $r_i$ | $d_i$ | $n$ | $\nu$ |
|---|---|---|---|---|
| 13 | −27.42 | 0.6 | 1.785 | 44.2 |
| 14 | 24.9 | 2.5 | 1.755 | 27.5 |
| 15 | −200.46 | variable ($d_{15}$) | | |
| 16 | −321.82 | 1.0 | 1.698 | 30.1 |
| 17 | 266.0 | 2.2 | 1.696 | 55.7 |
| 18 | −33.812 | 0.1 | | |
| 19 | 235.50 | 1.5 | 1.64 | 60.2 |
| 20 | −57.51 | 0.7 | | |
| 21 | ∞ | 11.0 | | |
| 22 | ∞ | 6.0 | 1.638 | 45.4 |
| 23 | 21.7 | 3.15 | 1.757 | 47.9 |
| 24 | 65.65 | 0.1 | | |
| 25 | 11.5 | 3.88 | 1.713 | 54.0 |
| 26 | 36.0 | 1.59 | 1.805 | 25.4 |
| 27 | 8.13 | 6.29 | | |
| 28 | −13.8 | 1.72 | 1.784 | 26.2 |
| 29 | 47.46 | 3.9 | 1.677 | 53.3 |
| 30 | −18.66 | 1.76 | | |
| 31 | 137.39 | 2.36 | 1.664 | 35.8 |
| 32 | −31.92 | 0.1 | | |
| 33 | 21.42 | 1.8 | 1.592 | 35.6 |
| 34 | 1049.32 | 1.2 | | |
| 35 | ∞ | 6.8 | | |
| 36 | ∞ | | 1.638 | 55.4 |

The value each of the variable air spaces $d_5$, $d_{12}$ and $d_{15}$ in the above table are as follows:

|   | wide angle $f = 7.483$ | intermediate $f = 15.816$ | telephoto $f = 58.057$ |
|---|---|---|---|
| $d_5$ | 1.378 mm | 20.820 mm | 40.068 mm |
| $d_{12}$ | 41.919 | 19.997 | 3.611 |
| $d_{15}$ | 1.659 | 4.139 | 1.278 |

Figure 5:
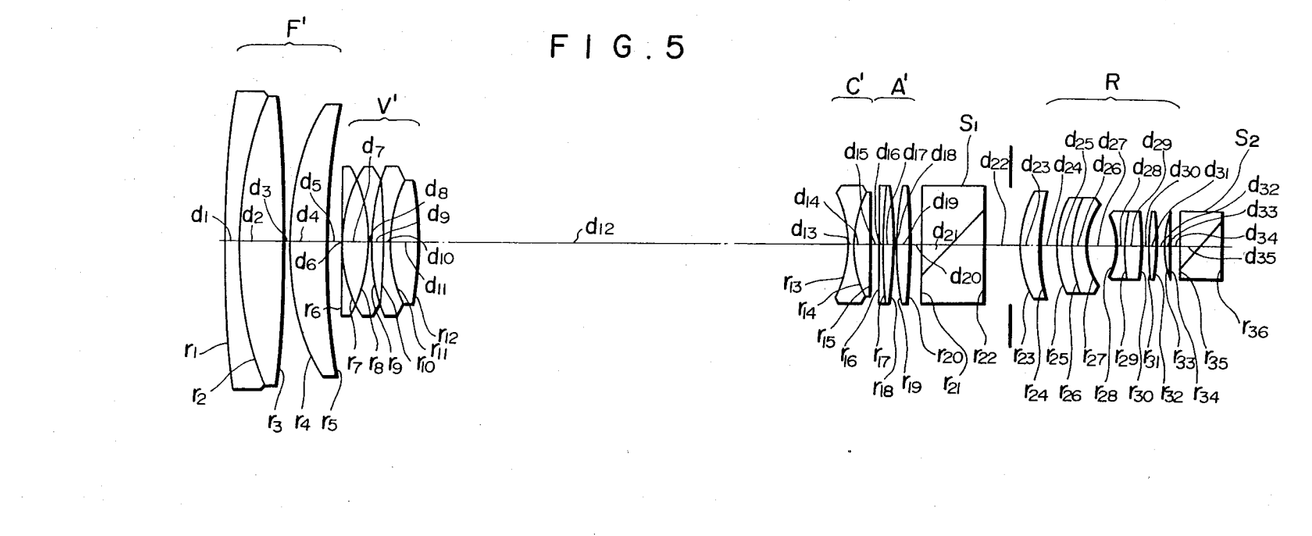
FIG. 5 is a longitudinal sectional view showing another embodiment of the optical system shown in FIG. 3.

In order to achieve the extreme closeup photography in the above described optical system, when the focusing lens F', the variator V' and the compensator C' shown in FIG. 5 are moved as a whole forwardly by 2 mm with respect to the stationary optical components located behind the above three components and, thereafter, zooming operation is effected so as to achieve the wide angle position, the intermediate position and the telephoto position, then the distance S (mm) from the front surface of the focusing lens F' to the object and the magnification $\beta$ obtained at each position of the zooming are as follows:

|   | $f = 7.483$ | $f = 15.816$ | $f = 58.057$ |
|---|---|---|---|
| S | −2.45 mm | −67.82 mm | −1878.92 mm |
| $\beta$ | −0.1949 | −0.0922 | −0.0251 |

The focusing lens F' is at the innermost position.

It is possible to maintain the magnification substantially constant by appropriately adjusting the focusing lens.

If the forward shifting of the above described three optical components is increased to 10.68mm, an object lying at a distance of 0.76mm from the front lens can be made in focus under the condition of telephoto position, and the magnification in this condition is −0.1342.

It is possible to decrease the distance of the object to Omm by appropriately varying the amount of the shifting of the above three optical components.

A mechanism for shifting the above described optical system along the optical axis will be described below with reference to FIG. 4, FIG. 6A and FIG. 6B.

Figure 6A:
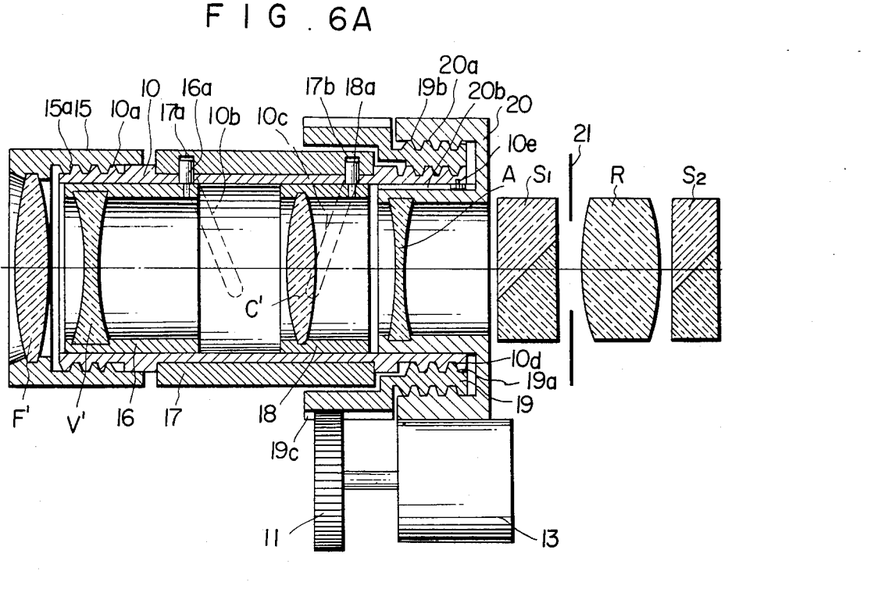
FIG. 6A is a view in cross-section showing an embodiment of the shifting mechanism for effecting the shifting of the optical systems shown in FIGS. 3 – 5 and FIG. 6B is a fragmentary perspective view showing the elements shown in FIG. 6A.
Figure 6B:
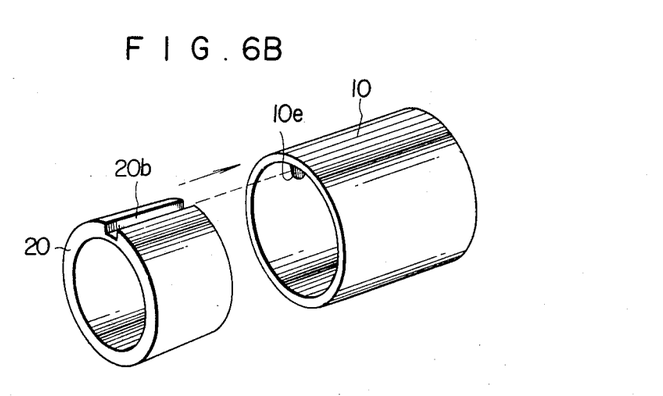

The optical system in FIG. 6A is shown as a simplified form from those shown in FIGS. 4 and 5. In the figure, the lens barrel 15 supporting the front focusing lens F' is formed with helicoid portion 15a, which is rotatably fitted with a helicoid portion 10a provided on the lens barrel 10 which supports the above three optical components integrally for shifting them along the optical axis by the rotation relative to each other. The variator V' is supported by a holding lens barrel 16 to which a pin 16a is secured, the pin 16a slidably engaging with a cam groove 10b formed in the lens barrel 10 while the tip of the pin 16a is received in a hole 17a provided in a zooming operating ring 17 rotatably fitted around the lens barrel 10. The compensator C' is supported in a holding lens barrel 18 which has a pin 18a secured thereto, the pin 18a slidably engaging with a cam groove 10c formed in the lens barrel 10 while the tip of the pin 18 a is received in a hole 17b provided in the zooming operating ring 17. A helicoid portion 10d is provided at the rear end of the lens barrel 10 and the helicoid portion 10d engages with the helicoid portion 19a of a macrophotography operating ring 19. Another helicoid portion 19b is also formed in the operating ring 19, which engages with the helicoid portion 20a of a stationary cylinder 20. In order to rotate the operating ring 19, a motor 13 is provided which has a gear 11 engaging with a gear 19c formed in the operating ring 19. The stationary cylinder 20 supports the afocal lens A and the cylinder 20 is fixedly secured to the camera body. A groove 20b is formed in a portion of the outer periphery of the stationary cylinder 20 along the optical axis and a pin 10e secured to the inner surface of the holding lens barrel 10 engages with the groove 20b so that the movement of the lens barrel 10 is guided by the pin 10e along the groove 20b. A diaphragm stop is arranged between the beam splitter S₁ which divides the optical path into the photographing optical path and the finder optical path and the relay lens.

The operation of the shifting mechanism as described above is as follows. When focusing is effected with respect to an object located at a normal distance between infinity and the usual focal range, the focusing ring 15 is rotated so as to shift the focusing lens F' along the optical axis. In order to effect the zooming operation, the ring 17 is rotated so that the variator V' and the compensator C' are shifted along the optical axis following the configuration of the cam grooves 10b and 10c. Then, when the extreme closeup photography is effected, the motor 13 is energized so as to rotate the operating ring 19 through the engagement of the gear 11 with the gear 19c. The operating ring 19 is allowed to rotate with respect to the stationary cylinder 20 through the engagement of the helicoid portion 19b and the helicoid portion 20a. On the other hand, the lens barrel 10 is supported by the operating ring 19 through the engagement of the helicoid portion 10d and the helicoid portion 19a, and the lens barrel 10 together with the focusing lens F', the variator V' and the compensator C' integrally supported thereby is shifted forwardly toward the object from the image forming plane along the optical axis according to the configuration or the lead of the helicoid portion by the rotation of the operating ring 19. It is the pin-groove engagement formed by the groove 20b and the pin 10e that guides the shifting movement of the lens barrel 10 along the optical axis.

Of course, it is possible to manually rotate the operating ring 19, or to manually shift the lens barrel 10.

It must be understood that various modifications can be applied to the shifting mechanism described above within the concept of this invention.

What is claimed is:

1. A variable focus optical system capable of extreme closeup photography comprising:
a first optical means for focussing said optical system on an object located at different distances within a selected normal range, said first optical means being movable along the optical axis of said optical system
a second optical means arranged on the optical axis of said optical system to vary the focal length of said optical system, said second optical means being operable independently of said first optical means, and having a first lens group and a second lens group which are mutually displaceable along said optical axis in a predetermined relationship for varying the focal length of said optical system
an extreme closeup mechanism for focussing said optical system on an object located at a distance closer than the normal range, said extreme closeup mechanism comprising means for displacing both said first and second optical means in fixed relationship to each other along the optical axis of said optical system during operation of said extreme closeup mechanism, said second optical means also being operable independently of said extreme closeup mechanism for zooming said second optical means during the closeup operation.

2. An optical system according to claim 1 wherein said optical system further comprises a third optical means located at a fixed position for forming images.

3. An optical system according to claim 1 wherein said extreme closeup mechanism comprises:
a carrying means connected operatively with said first and second optical means,
an operating means for actuating said carrying means so as to subject the locations of said first and second optical means to be varied integrally along the optical axis of said optical system.

4. An optical system according to claim 1 wherein the first lens group of said second optical means is a variator lens group, and the second lens group of said second optical means is a compensator lens group.

5. An optical system according to claim 3 wherein said extreme closeup mechanism further comprises a means for guiding said carrying means along the optical axis of said optical system.

6. An optical system according to claim 1 wherein said second optical means further comprises a guide means for subjecting said first and second lens groups to be mutually displaceable along the optical axis of said optical system under a predetermined relationship for varying the focal length of said optical system.

7. A variable focus optical system capable of extreme closeup photography comprising:
a focusing means for subjecting said optical system to focus on an object located within a normal focusing range, said means being provided with a focusing lens means movable along the optical axis of said optical system a zooming means operable independently of said focusing means to vary the focal length of said optical system, said zooming means being composed of a variator lens means located on the optical axis of said optical system, a compensator lens means located on the optical axis of said optical system, and a guide means for subjecting said variator lens means and compensator lens means to be mutually displaceable along said optical axis under a predetermined relationship for varying the focal length of said optical system an extreme closeup mechanism for subjecting said optical system to focus on an object located at a distance closer than the normal focusing range, said mechanism being connected operatively with said focusing means and said zooming means so as to be capable of displacing integrally said focusing lens means, said variator lens means and said compensator lens means along said optical axis, said zooming means being further operable independently of said closeup mechanism to achieve a different focal length of said optical system during the closeup operation.

8. A variable focus optical system capable of extreme closeup photography comprising:

a focusing optical means arranged on the optical axis of said optical system for subjecting said optical system to focus on an object located at a distance varying from an infinitely long distance to a selected short focus distance a normal focusing mechanism for displacing said focusing optical means along said optical axis so as to subject said optical system to focus on said object a zooming optical means arranged on the optical axis of said optical system for varying the focal length of said optical system, said optical means being composed of a variator lens means and a compensator lens means a zooming mechanism for varying the length of said optical system by placing said zooming optical means on the optical axis independently of said optical means, said mechanism comprising means for subjecting said variator and compensator lens means to be mutually displaceable along said optical axis under a predetermined relationship for varying the focal length of the optical system an extreme closeup mechanism for subjecting said optical system to focus on an object at a distance closer than said usual distance, said mechanism being connected operably to said focusing optical means and zooming optical means so as to be displace said two optical means together along the axis of said optical system, said zooming mechanism being further movable independently of said closeup mechanism to achieve a different focal length of the optical system during the closeup operation.

9. A variable focus optical system capable of extreme closeup photography comprising:

a focal lens means arranged on the optical axis of said optical system a normal focusing mechanism for displacing said focusing lens means along said optical axis so as to subject said optical system to focus on an object located within a normal focusing range a zooming lens means arranged on the optical axis of said optical system, said zooming lens means comprising a variator lens group and a compensator lens group a zooming mechanism for displacing said zooming lens means along said optical axis independently of said focusing lens means so as to vary the focal length of said optical system, said mechanism comprising a first carrying means for holding said variator lens group a second carrying means for holding said compensator lens group, and a guide means operatively connected with said first and second carrying means so as to subject said variator lens group as well as said compensator lens group to be mutually displaceable along said optical axis under a predetermined relationship for varying the focal length of said optical system an extreme closeup mechanism for displacing said focusing lens means and said zooming lens means integrally along said optical axis so as to subject said optical system to focus on an object located at a distance closer than said normal focusing range, said mechanism comprising a third carrying means for supporting said focal lens means as well as said zooming lens means integrally and being movable linearly along the optical axis of said optical system, and an operating means for displacing said third carrying means along said optical axis so as to change the locations of said focusing lens means as well as said zooming lens means integrally on said optical axis, said zooming mechanism being further operable independently of said closeup mechanism to achieve a different focal length of said optical system during the closeup operation.

10. An optical system according to claim 9 wherein said extreme closeup mechanism further comprises a means for admitting said third carrying means to move only the direction along the optical axis of said optical system.

11. An optical system according to claim 9 wherein said extreme closeup mechanism further comprises a motor-drive means for actuating said operating means.

12. An optical system according to claim 9 wherein the third carrying means of said extreme closeup mechanism is connected with said normal focusing mechanism, and said normal focusing mechanism is capable of operating independently of said extreme closeup mechanism.

13. An optical system according to claim 9 wherein the guide means of said zooming mechanism is mounted on the third carrying means of said extreme closeup mechanism.

14. In a variable focus optical system including a focusing lens means to focus said optical system on an object in a normal range a normal range focusing mechanism to move said focusing lens means along the optical axis of said optical system a variator lens means and a compensator lens means to vary the focal length of said optical system a zooming mechanism to move said variator lens means and said compensator lens means along said optical axis in a predetermined relationship of relative movement to vary the focal length of said optical system, and a relay lens means fixedly positioned on said optical axis, the improvement comprising:

an extreme closeup mechanism for subjecting said optical system to focus on an object located at a distance closer than a normal range, said mechanism being connected operatively with said focusing lens means, said variator lens means and said compensator lens means so as to displace said three lens means integrally along said optical axis, said zooming mechanism being operable independently of said closeup mechanism, thereby permitting the zooming effect to be achieved during the closeup operation.

* * * * *